Patented Nov. 1, 1949

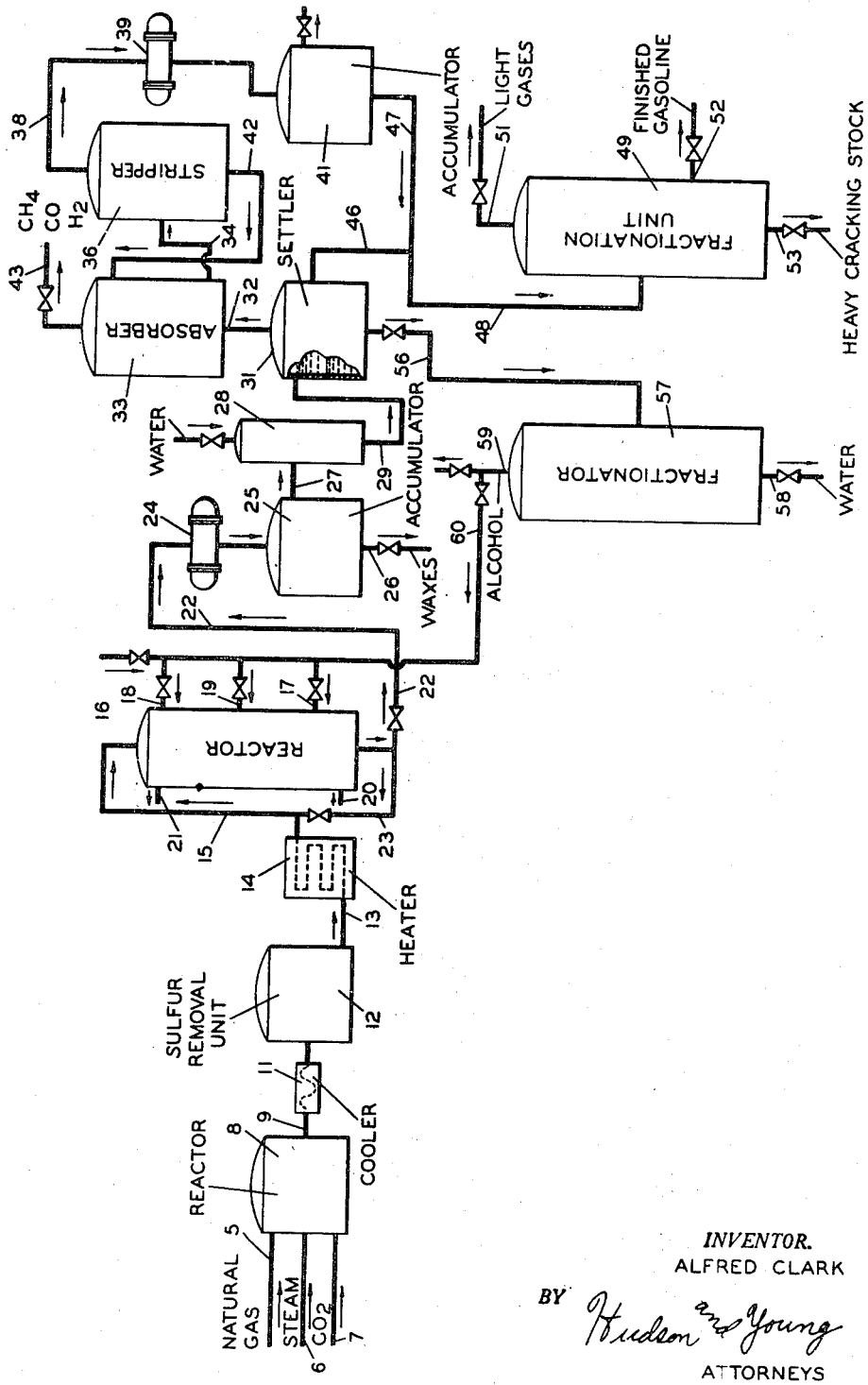

2,486,633

UNITED STATES PATENT OFFICE 2,486,633

SYNTHESIS OF HYDROCARBONS

Alfred Clark, Bartlesville, Okla., assignor to Phillips Petroleum Company, a corporation of Delaware Application September 10, 1945, Serial No. 615,349

4 Claims. (Cl. 260—449.6)

This invention relates to the synthesis of hydrocarbons. In one aspect this invention relates to the conversion of hydrogen and an oxide of carbon into hydrocarbons. In still another aspect this invention relates to the removal of exothermic heat of reaction liberated during the synthesis of hydrocarbons having more than one carbon atom per molecule by the interaction of hydrogen and carbon monoxide in the presence of a catalyst.

It has been known for some time that hydrogen and carbon monoxide may be made to react exothermically in the presence of certain catalysts and under specific reaction conditions to form hydrocarbons and oxygenated compounds. The formation of hydrocarbons having more than one carbon atom per molecule, especially those hydrocarbons boiling within the gasoline range, is favored by relatively low pressures and low temperatures. In general, the synthesis of hydrocarbons by the hydrogenation of carbon monoxide is accomplished in the presence of a metal chosen from group VIII of the periodic table as a catalyst at pressures below about 500 pounds per square inch gage and at temperatures below about 350° C. The synthesis feed gas comprises a mixture of about 2 moles of hydrogen per mole of carbon monoxide and is prepared by the catalytic conversion of natural gas, steam and carbon dioxide. Characteristically, certain reaction conditions are optimum for the particular metal catalyst being used. Moreover, whether a normally gaseous, liquid or solid hydrocarbon is produced depends upon the reaction conditions, especially temperature, which are used to effect the synthesis. Accurate control of the reaction conditions and dissipation of excess heat liberated by the exothermic nature of the reaction are necessary to obtain an optimum yield of the desired product.

When hydrogen and carbon monoxide react to form hydrocarbons, part of which boil in the gasoline range, an amount of heat is evolved equivalent approximately to one-fifth of the heat of combustion of the original reactants converted. The liberation of large quantities of heat during the course of this reaction has presented a serious obstacle to the industrial use of this process, since it is essential to maintain the temperature of reaction within very narrow limits in order to obtain high yields of desirable products. Excessive rise in temperature during the reaction caused by the liberation of heat results in the formation of methane.

Both the hydrocarbon product and the heat of reaction of carbon monoxide and hydrogen are variable and depend on the catalyst and conditions of operation used. The formation of the methylene radical brings about an exothermic heat of reaction of about 48,000 calories per mole of methylene formed and is the minimum amount of heat that can be released from two moles of hydrogen reacting with one mole of carbon monoxide. However, in actual practice, the formation of higher hydrocarbons, such as by polymerization of methylene, bring about an additional heat of reaction which results in the liberation of heat exceeding 48,000 calories.

The application of thermodynamic principles to the hydrogenation of carbon monoxide indicates the feasibility of producing those hydrocarbons boiling within the gasoline range at accurately controlled temperatures. The approximate linear free energy-temperature relations for the synthesis of methane, ethane, normal hexene, normal hexane, and normal octane, are illustrated by the following over-all equations for reactions occurring in the gas phase with nickel or cobalt catalysts. These equations are represented graphically in "The Chemistry of Petroleum Derivates" by Carleton Ellis, vol. II; 1934, page 1226.

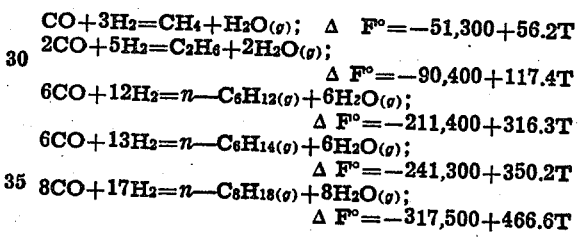

$CO + 3H_2 = CH_4 + H_2O_{(g)}$; $\Delta F° = -51,300 + 56.2T$
$2CO + 5H_2 = C_2H_6 + 2H_2O_{(g)}$;
$\Delta F° = -90,400 + 117.4T$
$6CO + 12H_2 = n\text{-}C_6H_{12(g)} + 6H_2O_{(g)}$;
$\Delta F° = -211,400 + 316.3T$
$6CO + 13H_2 = n\text{-}C_6H_{14(g)} + 6H_2O_{(g)}$;
$\Delta F° = -241,300 + 350.2T$
$8CO + 17H_2 = n\text{-}C_8H_{18(g)} + 8H_2O_{(g)}$;
$\Delta F° = -317,500 + 466.6T$ The production of hydrocarbons from carbon monoxide and hydrogen is favored thermodynamically, as is evident from the large negative values of the standard free energy change for the over-all reactions. In the series, methane, ethane, normal hexane, and normal octane, the free energy change becomes more negative with the size of the molecule so that the formation of higher members of the series is quite feasible. At about 300° C., and atmospheric pressure, it should be possible to obtain any of the paraffin hydrocarbons by reduction of carbon monoxide in the presence of appropriate catalysts. The validity of this conclusion has been confirmed by the isolation and identification of some of the reaction products which included practically all the members of the aliphatic series from ethane to hectopentacontane ($C_{150}H_{302}$).

For a given catalyst, the free energy change for the production of hydrocarbons increases with temperature as is indicated from the above equations. This is true regardless of the nature of hydrocarbons formed. The equations indicate that upon increasing the temperature of reaction, the free energy change becomes less negative. Assuming all reactions occurring at random, the product having the greatest negative free energy change will predominate. Thermodynamically the tendency to form the heavier hydrocarbons is greatest at relatively low temperatures. At relatively high temperatures the tendency to form methane is greatest, as previously indicated.

The close temperature control required coupled with the highly exothermic nature of the reactions involved presents a most difficult problem in operating on commercial scale. Various methods have been proposed to solve this problem, but with only limited success.

For example, it has been proposed to pass the reacting gases through a plurality of alternate zones containing catalyst and non-catalytic material situated within a reaction chamber, and removing heat of reaction through the walls of the reaction chamber whereby a temperature gradient along the path of the flowing gases is prevented.

It has also been proposed to circulate the reacting gases rapidly through the reaction zone thereby obtaining small conversion per pass and consequently only a small amount of heat liberated per pass.

Processes have also been disclosed wherein the exothermic heat of reaction is removed as it is evolved by utilizing a sufficient quantity of the catalyst and by absorbing the same as sensible heat of the catalyst, separating the heated catalyst from the reaction zone, removing the heat of reaction therefrom by cooling, and again utilizing the cooled catalyst in the reaction zone.

Other processes have been disclosed in which the reaction temperature is controlled by passing the synthesis gas mixture under synthesizing conditions through a plurality of alternate catalyst and cooling zones. The gas is contacted with a cooling liquid in the cooling zones to maintain the gas temperature within a predetermined temperature range.

In catalytic processes for converting hydrogen and carbon monoxide to hydrocarbons, especially where use is made of alternate catalyst and cooling zones or alternate catalyst and non-catalyst zones for dissipation of heat of reaction, the size of the reaction chamber is disproportionally large for the amount of conversion which takes place therein in a given time. If, for example, fifty per cent of the volume of the reaction chamber is occupied by non-catalytic material or used as cooling zones, a reaction chamber twice as large would be required to obtain a certain space-time yield than would be required in a chamber in which the entire volume is filled with catalyst. Furthermore, if extremely high space velocities and recirculation of the unconverted reactants and gaseous products are employed in order to decrease the quantity of heat evolved, expensive, additional equipment is required for circulating the gases and for efficiently condensing liquid from a high-velocity gas stream. Catalyst erosion also increases when a high-velocity gas stream is employed. Bringing the reacting gases into indirect heat exchange with a circulating cooling liquid works well in tubes approximately one-half inch in diameter or less; but for tubes of larger diameter, the rate of heat dissipation is insufficient to maintain a constant temperature.

It is, therefore, an object of this invention to provide a method for effecting accurate control of the temperature of reaction in catalytic conversion processes without the aforesaid difficulties.

Another object is the removal of excess heat of reaction from a reaction zone above that required to maintain the reactants at the required temperature of reaction in a hydrocarbon synthesis process.

Still another object is to increase the proportion of a catalyst chamber occupied by the catalyst in an exothermal process for optimum yield of product.

Another object of this invention is to provide a process and apparatus for the interaction of hydrogen and carbon monoxide in which at least a portion of the exothermic heat of reaction evolved is dissipated as latent heat of vaporization.

A further object of this invention is to provide a process for the reaction of hydrogen with carbon monoxide with a minimum formation of the normally gaseous hydrocarbons.

Other objects and advantages will become apparent to those skilled in the art from the accompanying description and disclosure.

According to this invention, thermal control in a process for the synthesis of hydrocarbons having more than one carbon atom per molecule from hydrogen and an oxide of carbon is achieved by introducing an alcohol into the reaction zone of the process. The principal function of the alcohol is to remove excess heat liberated by the exothermic hydrocarbon synthesis reaction, thus preventing an undesirable temperature rise during the reaction.

In the preferred embodiment of the present invention, a liquid alcohol is introduced into the reaction zone adjacent the entering synthesis gas. Additional alcohol may be introduced at a plurality of points in the direction of flow of synthesis gas through the reaction zone. Liquid alcohol is vaporized in the reaction zone and the vaporization of the alcohol absorbs heat evolved during the exothermic hydrocarbon synthesis reaction.

The alcohol used to effect thermal control comprises a monohydric alcohol, preferably methyl alcohol or ethyl alcohol. Other aliphatic alcohols of higher molecular weight such as propyl alcohol, amyl alcohol, etc., may be used without departing from the scope of this invention. In certain cases, as, for example, when iron catalysts are used, alcohols are produced as by-products of the carbon monoxide-hydrogen reaction; separation and recycle of these alcohols is within the scope of this invention.

The use of alcohol is particularly advantageous since its latent heat of vaporization is large. Moreover, any decomposition of the alcohol in the reaction zone yields hydrocarbons similar to the desired product with relatively little exothermic heat of reaction evolved. For example, methyl alcohol and ethyl alcohol may decompose according to the following equations to produce normal octane.

(1) 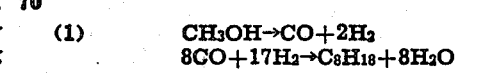

(2) 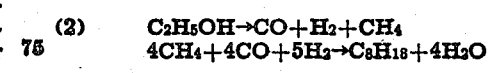

(3) 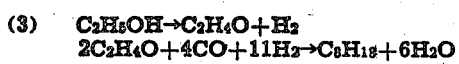
$C_2H_5OH \rightarrow C_2H_4O + H_2$
$2C_2H_4O + 4CO + 11H_2 \rightarrow C_8H_{18} + 6H_2O$ Under process conditions, the endothermic heat requirement in the formation of octane from liquid methyl alcohol and liquid ethyl alcohol is approximately 309 B. t. u. and 293 B. t. u., respectively, per pound of alcohol; whereas the latent heat of vaporization of liquid methyl alcohol and liquid ethyl alcohol is approximately 470 B. t. u. and 370 B. t. u., respectively, per pound of alcohol. Even though some of the alcohol decomposes to form hydrocarbons the overall process involving a change from a liquid state to a gaseous state and the conversion of the alcohol to hydrocarbons is endothermic. In actual practice the decomposition and conversion of alcohol to hydrocarbons is relatively small which results in an even larger endothermic heat requirement attributed to the presence of the alcohol than indicated.

Undecomposed alcohol passes through the process and is separated from the hydrocarbon product in the conventional manner, such as by fractional distillation. The alcohol which decomposes is converted to valuable hydrocarbons composing a portion of the hydrocarbon product. In this manner complete utilization of the cooling medium is achieved.

Ethylene which may be formed by the dehydration of ethyl alcohol combines with low-boiling hydrocarbon products to form more desirable higher boiling hydrocarbons.

The presence of the alcohol does not decrease the efficiency of the synthesis catalyst.

In practice, alcohol alone is not used to remove all the excess heat of reaction in the synthesis process, but alcohol is usually used in combination with external cooling means. For example, a cooling jacket often surrounds the reaction zone through which jacket is passed a suitable fluid medium, such as water, mineral seal oil, etc., to remove the exothermic heat as sensible heat of the fluid.

When using methyl alcohol at least 0.002 pound of alcohol is required per B. t. u. of heat to be removed by the vaporization of the alcohol and preferably not more than about 0.003 pound of methyl alcohol per B. t. u. is used. When using ethyl alcohol at least 0.0025 pound of alcohol is required per B. t. u. of heat to be removed by the vaporization of the alcohol and preferably not more than about 0.0035 of ethyl alcohol is used. About 0.003 pound of alcohol per B. t. u. of heat removed is usually adequate for alcohols in general. A mixture of methyl and ethyl alcohol or other alcohols may be used, and in some cases an inert diluent, such as hydrocarbons, may be admixed with the alcohol. The use of excessive quantities of alcohol often results in a decrease in the reaction temperature below that required to assure an economical yield of product.

In practicing this invention, it is possible to use reaction chambers considerably larger in diameter than those normally used in the hydrogenation of carbon monoxide while comparable yields of valuable hydrocarbon products are obtained without the production of abnormal quantities of methane and other undesirable normally gaseous hydrocarbons.

Appropriate catalysts are those which have substantial hydrogenating power at low temperatures. Such catalysts comprise a metal or compound of a metal from group VIII of the periodic table, such as iron, cobalt and nickel. Cerium, manganese, titanium, zinc, thorium, and the oxides and other compounds of these metals have also been found to possess the necessary characteristics suitable for hydrogenating carbon monoxide to hydrocarbons. Mixtures of such catalysts may be employed or suitable agents or carriers may be impregnated with the catalysts to increase their efficiency and strength. The catalysts are usually in a finely divided form, such as pellets or granules.

Table I below shows the reaction conditions of temperature, pressure, and space velocity characteristic of some of the various catalysts which may be used in effecting the synthesis of hydrocarbons having more than one carbon atom per molecule.

TABLE I

Preferred ranges of operation of some common catalysts for the production of synthetic hydrocarbons

| | Catalyst | Pref. Temperature, °C. | Pref. Pressure, p. s. i. g. | Pref. Space Velocities, vol./vol. cat./hr. |
|---|---|---|---|---|
| 1 | Cobalt-Thoria | 190-210 | 100 | 90-110 |
| 2 | Iron-Alkali and/or Copper | 230-260 | 75-300 | 90-110 |
| 3 | Sintered Iron | 310-330 | 220-300 | 250-300 |
| 4 | Ruthenium | 190-210 | 1,200-1,500 | 90-110 |
| 5 | Nickel-Thoria | 190-210 | 15-50 | 90-110 |
| 6 | Nickel-Manganese-Alumina | 190-210 | 15-50 | 90-110 |
| 7 | Cobalt | 180-200 | 100 | 95-115 |

In general, the temperature range for the various catalysts which may be used to effect a synthesis of hydrocarbons is between about 150 and 400° C.

In carrying out the process of this invention, pressures ranging from sub-atmospheric to as high as about 2000 pounds per square inch gage may be used, but the preferred range is from about 50 to about 500 pounds per square inch gage, more particularly from about 100 to about 125 pounds per square inch gage.

Space velocities may be varied over a considerable range from low velocities of approximately 80 cubic feet per cubic foot of catalyst per hour such as are used normally over cobalt catalyst, up to about 400 or even as high as 30,000 cubic feet per cubic foot of catalyst per hour, such as are used over the sintered iron catalysts. These values represent the extremes in space velocities which may be used in carrying out this invention. Space velocity may be defined as volumes of gas at standard conditions of temperature and pressure per volume of catalyst per hour.

The composition of the synthesis feed gas is normally in a molar ratio of hydrogen to carbon monoxide between about 3 to 1 and about 1:1, however, for optimum yield of normally liquid hydrocarbons a ratio between about 2:1 and about 3:2 is preferred.

Upon use the catalyst may decrease in activity as the result of deposition of carbonaceous deposits thereon. Regeneration of the catalysts may be effected in conventional manner, such as by treatment with hydrogen at elevated temperatures.

By the process of this invention higher yields have been observed than obtained by conventional methods. Of the total hydrocarbon product, the normally liquid hydrocarbons constituted as high as about 75% by weight.

The drawing diagrammatically represents apparatus for a typical process for the synthesis of hydrocarbons in which an embodiment of the present invention is applicable.

In order that this invention may be more clearly understood and its applicability realized, a brief description of a typical process for the synthesis of hydrocarbons will be recited. Natural gas containing methane, steam and carbon dioxide obtained from suitable sources are introduced into reactor 8 through lines 5, 6 and 7, respectively. Hydrogen and carbon monoxide are formed in reactor 8 in the presence of a suitable catalyst at approximately atmospheric pressure and at a temperature between about 700 and about 800° C. The effluent from reactor 8 contains hydrogen and carbon monoxide in a molar ratio of about 2:1, and about 0.5 to about 1.0 mole per cent impurities, such as sulfur.

From reactor 8, the effluent passes to sulfur removal unit 12 by line 9 and through cooler 11. Both inorganic and organic sulfur are removed from the effluent in unit 12 by conventional methods known in the art. Inorganic sulfur may be removed by solvent extraction with an amine solution. Organic sulfur compounds are decomposed in the presence of a suitable catalyst, such as a copper oxide-lead chromate combination, at an elevated temperature of about 400° C. The resulting hydrogen sulfide from the decomposition is removed by solvent extraction. The purified effluent of hydrogen and carbon monoxide is then passed to heater 14 by line 13 and thence to reactor 16 by line 15.

In reactor 16, hydrocarbons are synthesized under reaction conditions similar to those previously described and in the presence of a suitable catalyst, such as sintered iron, cobalt-thoria, etc. A portion of the exothermic heat of reaction is removed by the vaporization of liquid alcohol introduced into reactor 16 through lines 17, 18 and 19; the major portion of the alcohol is added through line 18. The remaining excess heat of reaction above that required to maintain the desired reaction temperature at about 225° C. is removed by an external cooling medium passing through lines 20 and 21 countercurrently to the flow of gases in reactor 16. Reactor 16 contains a suitable catalyst for the synthesis of hydrocarbons, as previously discussed and shown in Table I.

From reactor 16 a vaporous effluent containing hydrocarbons and alcohol is passed via line 22 to cooler 24 where partial condensation is effected, and the condensate is collected in accumulator 25 and discharged therefrom through line 26. A portion of the effluent may be recycled to reactor 16 via line 23, if desired. This condensate comprises heavy hydrocarbons and waxes. The temperature of the effluent gases leaving reactor 16 is about 235° C. and cooling the gases to about 150° C. is sufficient to accomplish the degree of partial condensation desired in accumulator 25. The uncondensed gases from accumulator 25 are passed through line 27 to cooling tower 28 wherein the gases are condensed by a spray of water which cools them to about 25° C. Water, liquid hydrocarbons and alcohol are withdrawn from tower 28 through line 29 and are passed to settler 31 for a liquid phase separation between hydrocarbons and water containing alcohol dissolved therein.

Uncondensed gases leave settler 31 through line 32 and pass to mineral seal oil absorber 33. Recovery of propane, butane and heavier hydrocarbons is effected in absorber 33 by absorption of these hydrocarbons in mineral seal oil in the conventional manner. The hydrocarbon-rich mineral seal oil is withdrawn from the lower portion of absorber 33 and passed to a stripping column 36 via line 34. The light hydrocarbons, such as propane, butane, etc., are stripped from the mineral seal oil by lowering the pressure or heating in stripping column 36. Recovered hydrocarbons from stripping column 36 are passed via line 38 and condenser 39 to accumulator 41. Stripped mineral seal oil is recirculated to absorber 33 by means of line 42. Light gases such as hydrogen, methane, and carbon monoxide, are removed from absorber 33 through line 43 and discarded or used as fuel, if desired. These gases may also be passed to a second and smaller reactor (not shown) for the conversion of the remaining hydrogen and carbon monoxide to hydrocarbons.

Liquid hydrocarbons from settler 31 and accumulator 41 are passed via lines 46, 47 and 48 to fractionation unit 49 wherein desired products are separated and recovered. Light gases are withdrawn from fractionation unit 49 through line 51. Hydrocarbons boiling within the gasoline range are withdrawn through line 52, and heavier hydrocarbons are removed by line 53.

The aqueous phase in settler 31 is withdrawn by line 56 for the recovery of alcohol therefrom. The aqueous phase is passed to fractionator 57 through line 56. In fractionator 57 alcohol is separated and removed through line 59. Water is removed as a bottom product through line 58. The alcohol may be recycled, if desired, to reactor 16 through line 60.

EXAMPLE I

A synthesis gas comprising two moles of hydrogen per mole of carbon monoxide is reacted to form normally liquid hydrocarbons at a temperature of about 225° C. and about 100 pounds per square inch gage in the presence of a cobalt-thoria synthesis catalyst. The exothermic heat of reaction is removed and the temperature maintained constant partially by passing mineral seal oil around the reaction chamber. Heat not removed by the mineral seal oil is absorbed by introducing liquid methyl alcohol into the reaction chamber adjacent to the entering gas. Approximately half of the heat of reaction is removed by the mineral seal oil. In order to hold the temperature substantially constant at 225° C., about 6.5 pounds of alcohol per pound of normally liquid hydrocarbon formed is introduced into the reaction chamber. The effluent is condensed, and the components separated therefrom, including the alcohol which is recycled to the reaction chamber. The hydrocarbon fraction analyzed about 75 per cent or more normally liquid hydrocarbons.

EXAMPLE II

Under similar conditions of operation to those in Example I, ethyl alcohol is used to absorb the heat of reaction to maintain a substantially constant temperature in the reaction zone. Approximately half of the excess heat of reaction above that required to maintain the reactants at the desired temperature is removed by external cooling, while the remainder is removed by introducing alcohol into the reaction chamber. About 7.5 pounds of liquid alcohol per pound of normally liquid hydrocarbons formed is introduced into the reaction chamber. After separation, the hydrocarbon fraction analyzes about 75 per cent or more normally liquid hydrocarbons.

The present invention may be varied widely and various modifications will become apparent to those skilled in the art without departing from the scope thereof.

I claim:

1. A process for the synthesis of hydrocarbons having more than one carbon atom per molecule which comprises passing a gaseous mixture comprising hydrogen and carbon monoxide through a reaction zone in the presence of a synthesis catalyst, maintaining the molar ratio of hydrogen to carbon monoxide in said gaseous mixture between 2:1 and 3:2, maintaining a pressure in said reaction zone between 15 and 500 p. s. i. g., maintaining a temperature in said reaction zone between 150° and 400° C., maintaining a space velocity of gases in said reaction zone between 100 and 400, introducing into and vaporizing a liquid monohydric alcohol of from 1 to 5 carbon atoms per molecule in said reaction zone in an amount in the range of 0.002 to 0.0035 pound per B. t. u. of heat removed from said reaction zone by the alcohol so as to control the temperature therein and convert a portion of said alcohol to said hydrocarbons, withdrawing an effluent from said reaction zone containing hydrocarbons, recovering hydrocarbons from said effluent as a product of the process, separating unreacted alcohol from said effluent, and recycling the same to said reaction zone as a coolant in the process.

2. The improvement of the process of claim 1, wherein said monohydric alcohol is methyl alcohol.

3. The improvement of the process of claim 1, wherein said monohydric alcohol is ethyl alcohol.

4. The improvement of the process of claim 1, wherein said monohydric alcohol is amyl alcohol.

ALFRED CLARK.

REFERENCES CITED

The following references are of record in the file of this patent:

UNITED STATES PATENTS

| Number | Name | Date |
|---|---|---|
| 1,984,380 | Odell | Dec. 18, 1934 |
| 2,161,974 | Peck | June 13, 1939 |
| 2,167,004 | Pier et al. | July 25, 1939 |
| 2,244,196 | Herbert | June 3, 1941 |
| 2,247,087 | Herbert | June 24, 1941 |
| 2,406,851 | Redcay | Sept. 3, 1946 |
| 2,417,164 | Huber, Jr. | Mar. 11, 1947 |

OTHER REFERENCES

Hurd, "The Pyrolysis of Carbon Compounds," pages 148, 149, The Chemical Catalog Company 1929.